No. 729,032. PATENTED MAY 26, 1903.
J. S. BARCLAY.
HARNESS ATTACHMENT.
APPLICATION FILED JULY 8, 1902.
NO MODEL.
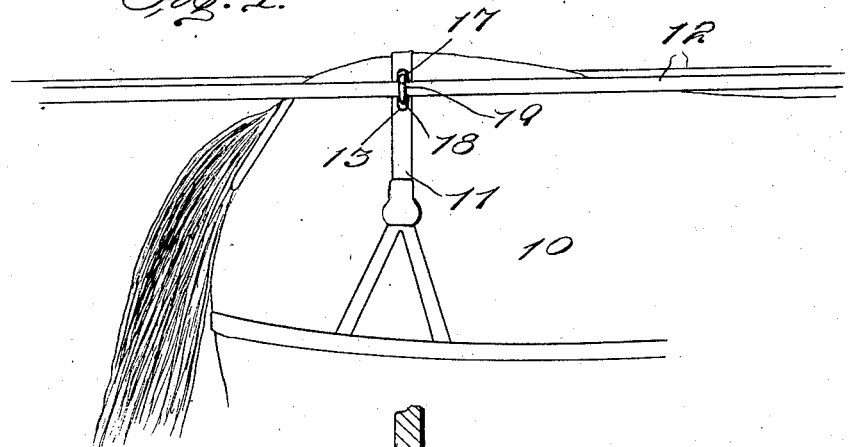
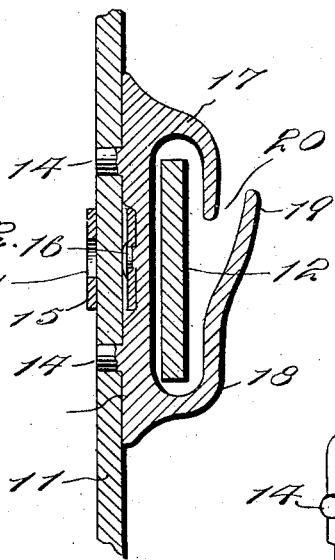
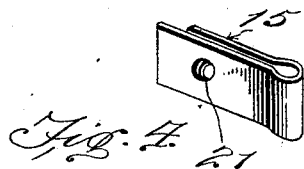
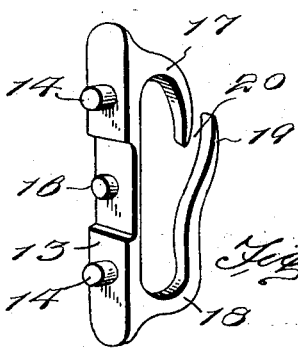
Witnesses
E. K. Stewart
C. N. Woodward
James S. Barclay, Inventor
by C. A. Snow & Co.
Attorneys No. 729,032. Patented May 26, 1903.

UNITED STATES PATENT OFFICE.

JAMES S. BARCLAY, OF MARION, INDIANA.

HARNESS ATTACHMENT.

SPECIFICATION forming part of Letters Patent No. 729,032, dated May 26, 1903.

Application filed July 8, 1902. Serial No. 114,796. (No model.)

*To all whom it may concern:*

Be it known that I, JAMES S. BARCLAY, a citizen of the United States, residing at Marion, in the county of Grant and State of Indiana, have invented a new and useful Harness Attachment, of which the following is a specification.

This invention relates to attachments to harness for the purpose of supporting the reins and may be located upon any suitable part of the harness where required, but will generally be located either upon the hip-straps to carry the reins and prevent them from becoming entangled in the buckles or upon the breast-strap or collar to prevent the reins being caught over the ends of the thills, and for the purpose of illustration the device is shown applied to the hip-strap portion of the harness, where its usefulness will be the greatest under ordinary conditions.

In driving a single horse the attachments will be arranged in pairs, one on each side, so as to engage both reins, and in driving a team one of the attachments will be arranged upon the hip-strap on the outer side of each horse to likewise engage both reins.

The invention has for its object the production of a simple easily-applied device with which the reins may be readily coupled by the driver from his seat in the vehicle and which will not accidentally release the reins while in use.

With these and other objects in view the invention consists in the novel construction and arrangement of parts hereinafter described, illustrated in the accompanying drawings, and particularly pointed out in the appended claim, it being understood that various changes in the form, proportion, size, and minor details of the structure may be made without departing from the spirit or sacrificing any of the advantages of the invention.

In the drawings illustrative of the invention, Figure 1 represents a side view of a horse with the improved device attached to the hip-strap. Fig. 2 is an enlarged vertical section of the device applied. Fig. 3 is a detached perspective view of the body portion of the device. Fig. 4 is a detached perspective view of the spring-clip.

The horse is represented at 10, the hip-strap at 11, and the reins at 12, one of which is shown passing across the hip-strap, all of these parts being of the ordinary form.

The device which is the subject of the present invention consists in a rein-holder comprising base-bar 13, having spurs 14 projecting from its under side, and between these spurs is secured a transverse spring-plate 15, secured by one end in a recess in the lower face of the bar and folded backward beneath the bar and extending beyond it on the other side, as shown. By this means the spring is formed with two leaves spaced apart and affording means for detachable connection to the strap 11, as shown. The spring will be of sufficient strength to grip the strap 11 with a tension strong enough to resist the removal of the bar 13 and its attachments from the strap 11 while the device is in use, but which will yield to a pressure strong enough to detach it. The spurs 14 enter apertures in the strap at each side of the holding-spring and assist in supporting it by preventing any swinging motion between the strap and the bar 13. This is an important feature of the invention and materially assists in holding the device in place upon the strap and materially decreases the tendency to work loose when under strong strains.

The bar 13 will be provided with a central projecting stud 16, over which a corresponding cavity in the shorter leaf of the spring will be placed and secured to the bar by riveting the stud. The outer leaf of the spring 15 will be provided with an enlarged aperture 21 opposite the aperture which embraces the stud 16 to provide for the insertion of the punch by which the stud 16 is riveted. By this means the spring may be securely and easily connected to the bar 13. From the outer face of the bar at its upper end a hook 17 extends and is turned downward in front of the bar, spaced a short distance from it and extending in a plane parallel with the plane occupied by said plate, while another hook 18 extends from the lower end of the bar and is carried upward for a short distance in alinement with the hook 17 and then flared outwardly and upwardly, terminating at a point above the lower end of the hook 17 and at a distance from it, as indicated at 19, leaving a channel 20 between the hook 17 and the end 19, as shown. By this means an elongated cavity is formed by the hooks 17 18, with a centrally-disposed curved entrance 20 leading into it. By this simple means an elongated receptacle for the reins is formed and a ready means for the insertion of the reins provided by the curved inlet 20, so that the reins, when inserted by the edge into the opening 20, will be readily guided downward into the cavity and will not require any special care to insert them.

When in use, the driver can very readily insert the reins from his seat by simply drawing the reins downward flatwise over the hip-strap and guide its lower edge into the opening 20 and thence into the cavity embraced between the hooks 17 18 and bar 13. This is an important advantage, as it enables the driver to insert the reins without the necessity of leaving the vehicle or even taking the time to insert the reins before he enters the vehicle.

The device may be made of any required size or strength to adapt it to different sizes and styles of harness and, as before stated, may be located upon any desired portion of the harness to bring it into position to support the reins and to prevent them from becoming entangled with other parts of the harness or attachments.

The opening 20 will always be equal to or a little greater in width than the thickness of the reins, so that the reins will always freely enter by gravity or by the exertion of a very small degree of force, such force as could readily be applied by the driver in drawing the lines over the harness and the back of the horse when placing them into position in the device, so that no resistance which may not be overcome by the driver from his seat will be met with in operating the device.

The spring-clip 15 will be made wide enough to enable the device to be detachably secured to harness-straps of various widths, whereby the usefulness and convenience of the device is increased.

The base-plate 13, with its studs and hooks, will be formed, preferably, in one single piece of malleable iron, but may be formed of other metal.

Having thus described my invention, what I claim is—

A rein-guide consisting of a base-plate having rein-receiving means projecting from one side thereof, and a stud projecting from the opposite side thereof, a spring-clip formed of spaced leaves provided with registering perforations, one of said perforations adapted to engage said stud and the other adapted to receive an instrument for riveting said stud upon said engaging clip-leaf.

In testimony that I claim the foregoing as my own I have hereto affixed my signature in the presence of two witnesses.

JAMES S. BARCLAY.

Witnesses:
 FRED P. DEAN,
 SIDNEY A. SMITH.